United States Patent
Alaskar et al.

(10) Patent No.: US 12,402,630 B1
(45) Date of Patent: Sep. 2, 2025

(54) BIOCONTROL FORMULATION FOR CONTROLLING PLANT PATHOGENS

(71) Applicant: KING SAUD UNIVERSITY, Riyadh (SA)

(72) Inventors: Abdulaziz Abdulrahman Alaskar, Riyadh (SA); Fatimah Olyan Alotibi, Riyadh (SA); Wesameldin Ismail Saber, Riyadh (SA); Khaled Mohammed Ghoneim, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/731,591

(22) Filed: Jun. 3, 2024

(51) Int. Cl.
- *A01N 63/38* (2020.01)
- *A01N 25/08* (2006.01)
- *A01P 3/00* (2006.01)

(52) U.S. Cl.
CPC ............. *A01N 63/38* (2020.01); *A01N 25/08* (2013.01); *A01P 3/00* (2021.08)

(58) Field of Classification Search
None
See application file for complete search history.

(56) References Cited

FOREIGN PATENT DOCUMENTS

| | | | | |
|---|---|---|---|---|
| CA | 2205954 | * | 6/1996 | |
| CN | 110122485 A | | 8/2019 | |
| CN | 110692631 A | | 1/2020 | |
| CN | 114958613 A | | 8/2022 | |
| JP | 1998509964 | * | 9/1998 | |
| JP | 2000-175614 | * | 6/2000 | |
| RO | 128889 B1 | | 6/2017 | |
| WO | WO-2010064889 A1 | * | 6/2010 | ............. A01N 63/04 |

OTHER PUBLICATIONS

Jaklitsch et al., Studies in Mycology, 2006, 56:135-177.*
Web MD, health benefits of semolina flour, 2024, 2 pages.*
Connick Jr., et al., "Formulation of mycoherbicides using a pasta-like process", DOI: https://doi.org/10.1016/1049-9644(91)90079-F, 1(4): pp. 281-287 (1991).
Shabana, et al., "Granular Pesta formulation of *Fusarium oxysporum* f. sp. *orthoceras* for biological control of sunflower broomrape: efficacy and shelf-life", DOI: https://doi.org/10.1016/S1049-9644(02)00130-5; 26(2): pp. 189-201, (2003).

* cited by examiner

*Primary Examiner* — Michael V Meller
(74) *Attorney, Agent, or Firm* — Nath, Goldberg & Meyer; Joshua B. Goldberg

(57) ABSTRACT

A biocontrol formulation for plant pathogens includes a *Trichoderma viride* filtrate and an inert substance selected from the group consisting of a viscosity reducer, a surfactant, flour, clay, and combinations thereof. In an embodiment, the filtrate includes conidia of the *Trichoderma viride*. In an embodiment, the filtrate includes byproducts obtained from the fermentation of *Trichoderma viride*. In an embodiment, the byproducts include at least one of the organic acids, growth regulators, and amino acids.

**1 Claim, 4 Drawing S

Figure 1:
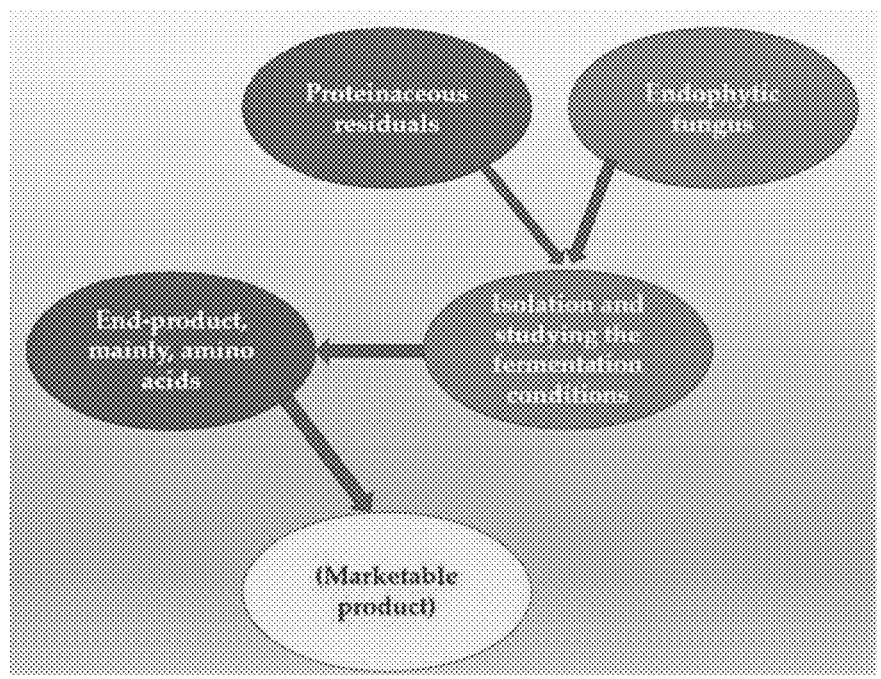
Figures 2A, 2B, 2C:
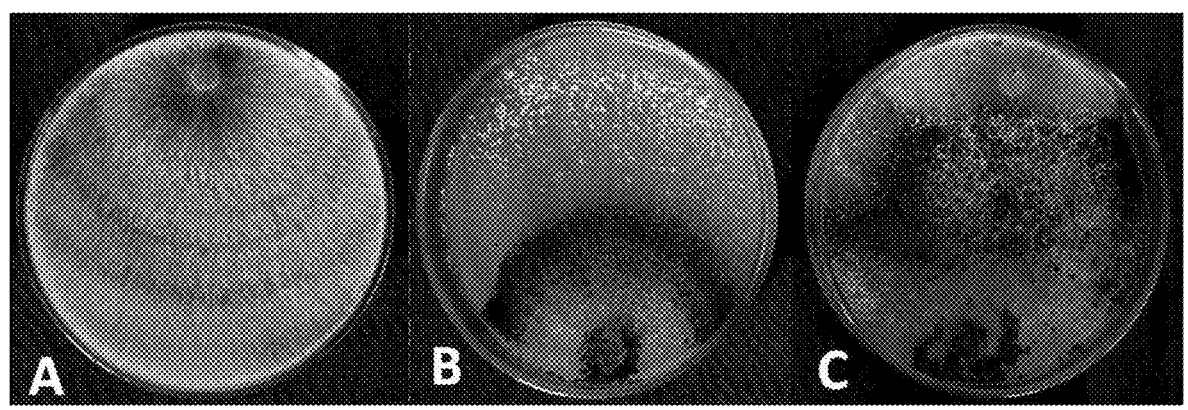
Figure 3A:
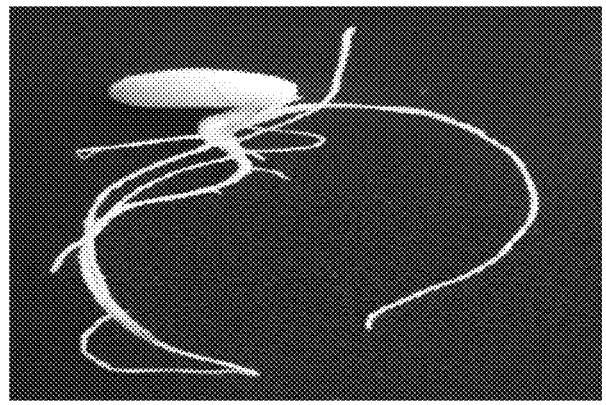
Figure 3B:
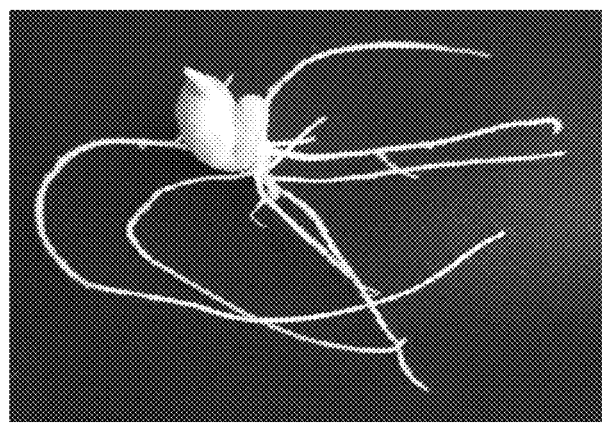
Figure 3C:
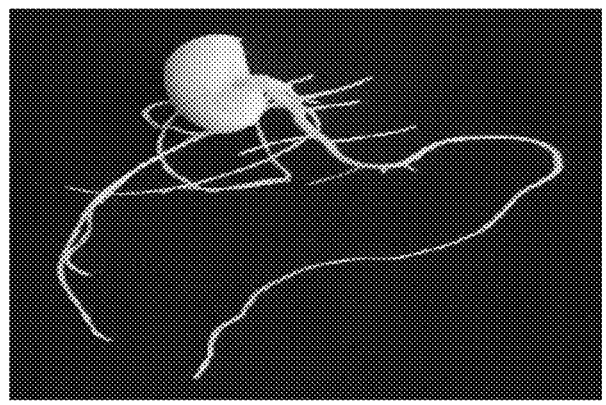
Figure 5G:
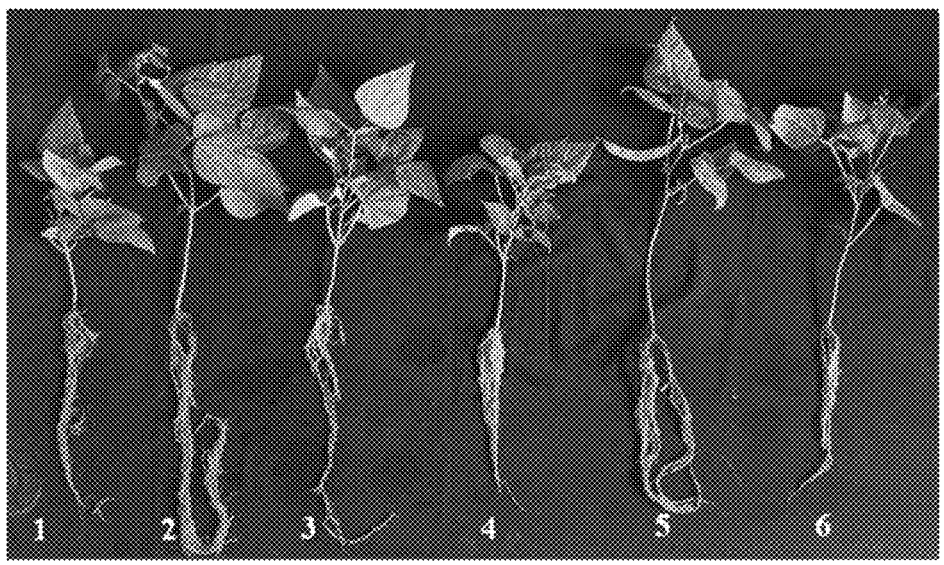

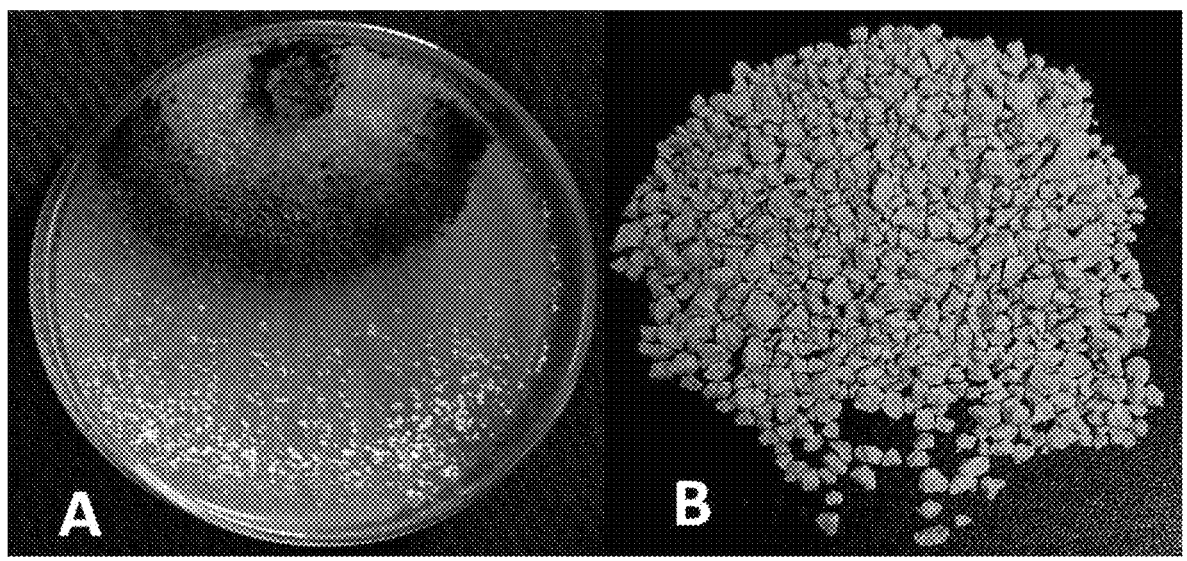
FIGS. 4A-4B
FIG. 5A      FIG. 5B      FIG. 5C
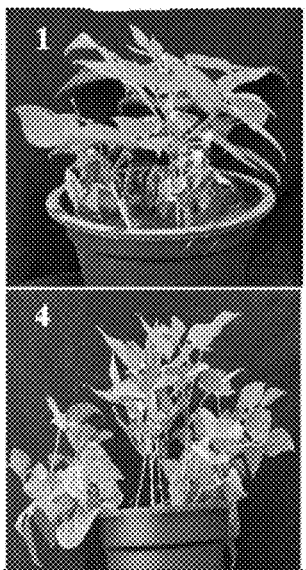 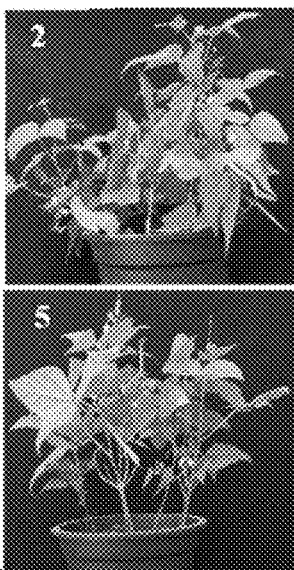 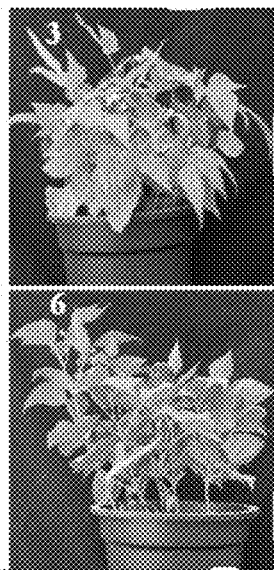
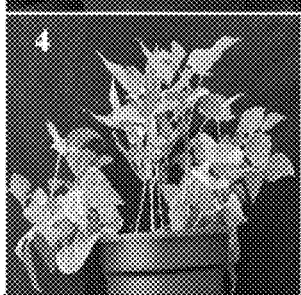 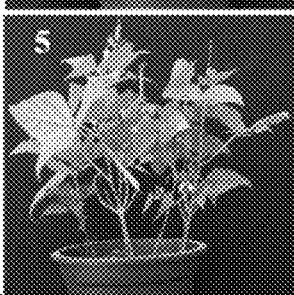 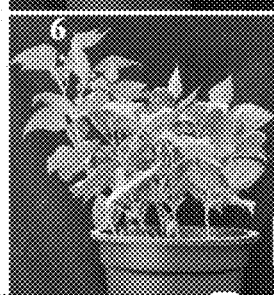
FIG. 5D      FIG. 5E      FIG. 5F

BIOCONTROL FORMULATION FOR CONTROLLING PLANT PATHOGENS

BACKGROUND

1. Field

The present disclosure relates to biological fungicides and, more particularly, a biocontrol formulation including endophytic *Trichoderma* for combatting fungal pathogens and promoting plant growth.

2. Description of the Related Art

Due to the harmful effects of chemical fungicides, pesticide-resistant strains of pathogens have become prevalent, as well as various health problems, such as cancer and chromosomal abnormalities in humans and animals. Accordingly, biological fungicides are preferable for use. Typically, however, the use of microorganisms for combatting plant pathogens tends to lose vitality and activity over time.

Thus, a biocontrol formulation including endophytic *Trichoderma* for combatting fungal pathogens and promoting plant growth solving the aforementioned problems is desired.

SUMMARY

The present subject matter focuses on a biological formulation for plant growth, which includes a *Trichoderma viride* filtrate and an inert substance. In an embodiment, the filtrate includes conidia of the *Trichoderma viride* virus and fermentation byproducts of the fungus. In an embodiment, the fermentation byproducts are selected from the group consisting of organic acids, growth regulators, and amino acids. In an embodiment, the inert substance is selected from the group consisting of viscosity reducers and surfactants. In an embodiment, the inert substance is selected from the group consisting of flour, clay, and a mixture of flour and clay. The formulation can be stable during storage. For example, the formulation can be safely stored at temperatures ranging from about-5 to 35° C.

In an embodiment, the biological formulations can be applied to plants to provide biological resistance against disease-causing agents in plants. In an embodiment, the biological formulation can be applied to plants to enhance plant growth, provide nutrients to the soil, especially in impoverished soils, and enhance the quality of plant products.

These and other features of the present subject matter will become readily apparent upon further review of the following specification.

BRIEF DESCRIPTION OF DRAWINGS

FIG. 1 is a diagram showing how to produce the marketable bio-compound from.

FIGS. 2A-2C are images depicting the mycelial radius of *R. solani* after an 8-day incubation period in the control (2A), the growth radius of *T. viride* (2B), and the growth of both *R. solani* and *T. viride* on the same plate (2C (*Trichoderma* envelops the disease-causing colony after 8 days of incubation in dual-culture plates).

FIGS. 3A-3C are images illustrating the response of bean seeds to treatment with (3A) the control; (3B) the filtrate of the *T. viride* fungus; and (3) treatment with the fungicide, after 14 days of germination.

FIGS. 4A-4B are images showing growth of (4A) *Trichoderma viride*; and (4B) and its biologically active granular composition.

FIGS. 5A-5G are images showing the impact of the formula on plant growth under greenhouse, where (5A) represents (1) *R. solani* pathogen only; (5B) represents (2) pathogen+formula; (5C) represents (3) pathogen+recommended fungicide; (5D) represents (4) negative control without treatment; (5E) represents (5) individual application of the proposed formula composition without infection; (5F) represents (6) individual application of fungicide without infection; and (5G) shows increase in plant length of plants (1)-(6).

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a biocontrol formulation for plant growth, which includes a filtrate of a biocontrol fungus and an inert substance. In an embodiment, the filtrate comprises a *Trichoderma viride* filtrate. In an embodiment, the *Trichoderma viride* filtrate includes conidia of the *Trichoderma viride*. In an embodiment, the *Trichoderma viride* filtrate includes byproducts obtained from fermentation of *Trichoderma viride*. In an embodiment, the byproducts include at least one of organic acids, growth regulators, and amino acids. In an embodiment, the inert substance is selected from the group consisting of viscosity reducers and surfactants. In an embodiment, the inert substance is selected from the group consisting of flour, clay, and a mixture of flour and clay. In an embodiment, the flour includes semolina durum. In an embodiment, the clay includes kaolin. The formulation can be stable during storage.

According to an embodiment, the formulation can be stable during storage. For example, the formulation can be safely stored at temperatures ranging from about −5 to 35° C.

The biological formulations can serve either singular or dual purposes. For example, biological formulations can provide biological resistance against pathogens or disease-causing agents in plants and/or enhance plant growth and plant quality by providing nutrients to the soil, especially in impoverished soils.

The biological formulations can exist in a solid or liquid state. In the solid state, the formulation can be in a powder form which is useful for convenient handling, trading, and storage. The powder form has an extended shelf life of at least 12 months. In liquid form, the formulation can have a shorter life span than in solid form.

As depicted in FIG. 1, the filtrate of the biocontrol fungus is obtained by isolating an endophytic fungus from plants, collecting proteinaceous plant biomass, and fermenting the fungus by cultivating the fungus on the proteinaceous plant biomass to provide a decomposed or fermented liquid filtrate enriched with various amino acids. After the fermentation process, the residual components can be repurposed as compost.

Endophytic fungi can be primarily isolated from leguminous plants, facilitating their growth in the same environment from which they were extracted. This enhances the decomposition process and the production of various fermentation byproducts including organic acids, and growth regulators, in addition to the amino acids derived from the breakdown of these residues by the endophytic fungi. In an embodiment, the endophytic fungi comprise *Trichoderma viride*. In an embodiment, the resulting decomposed or fermented product can be a liquid filtrate including *Trichoderma viride*, e.g., conidia of the *Trichoderma viride* and the fermentation byproducts. The liquid filtrate can be transformed into solid form by drying the liquid to form a dried product and grinding the dried product. In one embodiment, the dried product can provide the first biocontrol formulation to be applied to plants for plant growth.

In another embodiment, the liquid filtrate can be mixed with one or more inert substances to form an enhanced biocontrol formulation for plant growth. In an embodiment, the enhanced biocontrol formulation can be formed by mixing the liquid filtrate with semolina durum, kaolin, and water, to form a dough. The dough can be folded and extruded into sheets, then dried to form an enhanced dried product. The enhanced dried product can be ground into granules to form an enhanced biocontrol formulation for plant growth. In one embodiment, the enhanced biocontrol formulation can be applied to plants for plant growth.

FIG. 2 shows the antagonistic interaction between the isolated endophytic *Trichoderma* fungus and a notorious pathogenic fungus, *Rhizoctonia* fungus which causes wilting in a broad spectrum of plants. FIG. 2B depicts the antagonistic interaction between the two fungi, where the endophytic *Trichoderma* fungus exhibited significant growth and inhibited the growth of the pathogenic fungus.

FIG. 3 shows the influence of the formulation on the germination and growth of bean seedlings, in comparison to the use of a chemical pesticide.

FIG. 4 depicts the formulation, post-manufacturing, in its final granular form and an image of the endophytic organism. The final marketable product is depicted, which, after undergoing various manufacturing processes, is in a granular form, that facilitates easy handling.

The shelf-life viability of the formulation, shown in FIG. 4, was examined before in vivo testing. Although still active, the data indicated a minor decrease in the viability of the formula stored at 25° C. Interestingly, the formulation stored at a water activity level of 0.570 at 4° C., demonstrated the longest shelf-life, making it the most effective formulation compared to other treatments, after approximately 12 months of storage. This was followed by the formulation, stored at a water activity level of 0.125 at 4° C., which also preserved spore viability effectively when compared to the control samples. This analysis provides valuable insight into the long-term stability and effectiveness of the formulation under different storage conditions.

FIG. 5 shows the dual functionality of the biocontrol formulation. The biocontrol formulation can inhibit the growth of the pathogenic fungus that infected the plants as well as enhance the growth of the plants throughout various growth stages, culminating in the final yield.

*Phaseolus vulgaris*, a globally consumed food legume, was chosen as the plant model for evaluating the formulation. Application of the formulation to the plant resulted in a significant reduction in infection by *Rhizoctonia solani* in both seedlings (11.40%), and seeds (13.7%), thereby increasing plant survival by up to 74.90%. Application of the formulation led to notable decreases in disease parameters, comparable to the results from chemical fungicide treatment when compared with the infected control. The formulation also significantly improved the morphological, physiological, and growth properties of the plants, including an increase in plant length, number of branches, and fresh and dry weight, under stress conditions. Furthermore, the biocontrol formulation had a significant impact on enhancing plant production, even under the stress of pathogen infection. This demonstrates the formulation's potential to effectively manage plant diseases and improve overall plant health and productivity.

The protective measures are rooted in the sustainable development of bioactive and safe utilization and recycling of plant residues. This is achieved using endophytic microbes with distinct characteristics. This approach aligns with the Kingdom's 2030 plan, which emphasizes the optimal use of all available resources, environmental preservation, and pollution reduction by minimizing the use of pesticides and chemical fertilizers and promoting self-sustainability and recycling.

The application of the formulation can be effective in safeguarding public health and void diseases that arise from the use of plants treated with hormones or chemical fertilizers. Additionally, there are no risks associated with handling the formulation.

The use of the biocontrol formulation can be more economically favorable than the use of conventional pesticides because fewer applications of the biocontrol formulation are needed to achieve desirable results, e.g., a resistance against plant pathogens as well as a growth enhancer for plants. Furthermore, the possibility of establishing production units for the formulation adjacent to various farms allows for direct, safe, and economical recycling of plant residues.

The following examples illustrate the present teachings.

EXAMPLES

Materials

Samples of bean seeds were collected from the Riyadh and Al-Kharj regions in the Kingdom of Saudi Arabia. A highly pathogenic causative agent, *Rhizoctonia solani* Rs77, causing root rot in common bean plants, was isolated. Healthy-looking seed samples were selected and surface-sterilized, and the internally colonizing fungi, known as endophytic seed-borne fungi, were isolated. Through isolation attempts, a species of fungi belonging to the genus *Trichoderma* spp. was found to be the predominant isolate. Morphological identification of the obtained isolates was performed and, through antagonistic experiments, the *Trichoderma viride* AKW isolate demonstrated a high inhibitory capacity against the pathogenic causative agent *Rhizoctonia solani* Rs77.

Example 1

Formulation of *T. viride*

A simple formulation was developed utilizing the filtrate of the *Trichoderma viride* species, which contained the conidia of the fungus. The process of creating this formulation involved preparing dough by blending and homogenizing the fungal filtrate (1000 mL) with an appropriate quantity of flour of semolina durum and kaolin. Water was added as necessary until a well-mixed dough was formed. This dough was then processed through varying roller gaps of a machine (Marcato Model Ampia 150, Padova, Italy), where it was folded and extruded until uniformity was achieved. The final resulting dough was then extruded into sheets, without refolding, to a thickness of approximately one millimeter. These sheets were air-dried on aluminum foil under standard laboratory conditions ($23\pm2°$ C., $33\pm2\%$ humidity).

Once fully dried, the sheets were ground until the granules were uniform. The granule size was determined using sieves of 2.25 mm in size. Following production, the formula was packaged in air-tight plastic bags, making it ready for distribution and shipping. This process helped to ensure that the formulation was prepared in a marketable, and tradable form.

Example 2

Survivability of Fungus in Formula

The survivability of the fungus in the formula was assessed post-manufacturing and packaging. This was done to confirm the product's viability and suitability for long-term handling, selling processes, and stability under various storage conditions. The fungal viability of the formula was evaluated by soaking 0.1 g of the formula in 10 mL of sterilized water and agitating with 5-mm diameter glass beads until the granules dispersed. This was followed by creating a series of dilutions, from which 1 mL was plated onto the PDA medium supplemented with streptomycin sulfate (0.3 g/L) and chloramphenicol (0.1 g/L). This process ensured the viability of the spores in the product.

After 4 days of incubation at $23\pm2°$ C., the fungal colonies were counted and expressed as colony-forming units per gram of formula (cfu/g). This process ensured the product's viability and stability during various stages of handling and storage.

Example 3

Shelf-Life Viability in the Formulation

The stability of the formulated product was assessed in relation to various factors including duration of storage, temperature, and water activity levels. This quality control test was implemented immediately post-manufacturing to identify any potential adverse effects on the formula during the production process. The formula was stored at two distinct temperatures, 4 and 25° C., simulating refrigerator and room temperature conditions respectively, across varying levels of water activities. To evaluate the viability of the formula, three samples were extracted from each treatment every month for a duration of up to 12 months.

Example 3

Greenhouse Evaluation of the Formulation

Disinfected soil, composed of a 2:1 volume ratio of clay and sand, was placed into pots with a diameter of 40 cm. Each pot was individually inoculated with the pathogen at a concentration of 0.4% (w/w). The soil was thoroughly combined with the inoculum and consistently watered with tap water until it was close to field capacity. The pots were then left undisturbed for a week to allow the fungus to spread. Following this, 0.25 g of the prepared formula product was mixed into the soil. Five sterilized common bean seeds of the 'Strike' variety (obtained from Holland) were planted and covered with a 3 cm layer of soil. Pots that did not receive the formula treatment were used as a control group.

The pots were kept close to field capacity by regular watering with tap water and were maintained under greenhouse conditions. After the inoculation process, the soil was kept damp for the first two weeks to aid in seed germination and ensure the successful growth of the fungus. This methodical approach ensured the effective application of the formula and the successful growth of the plants.

Example 4

Disease Assessment, and Physiological Activities

The progression of the disease was monitored for each treatment (15 pots each) to evaluate the formula's effectiveness. After 14 days, the pre-emergence damping-off was calculated as the percentage of seed and seedling death before emergence, relative to the initial seed number. The post-emergence damping-off was determined, and the survival rate of plants was recorded at the end of 4 months. The *Rhizoctonia*-root rot was assessed: once a week and four weeks after the pathogen was inoculated. The disease development was assessed by evaluating the root damage using the scale developed by Carling et al. (1999). This comprehensive evaluation provided valuable insight into the formula's effectiveness in managing the disease. In addition, the physiological activities of the bean plants, including polyphenol oxidase, peroxidase, chlorophyll, and carotenoids, were measured. These measurements serve as indicators for disease management and enhancement of plant growth.

Example 5

Growth and Yield

A total of 15 plant samples were meticulously collected. The roots were thoroughly rinsed under running water to remove any soil or debris. Key growth parameters were then measured. These parameters included the lengths of the shoot and root, the fresh and dry weights of the plant, the number of leaves and branches, and the total leaf area. This comprehensive analysis provided valuable insight into the growth and development of the plants. Once the plants reached maturity, yield parameters were assessed. These included the count and weight of both fresh and dry pods per plant. This comprehensive analysis of growth and yield parameters provided valuable insight into the effectiveness of the treatment.

It is to be understood that the biocontrol formulation is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A biocontrol formulation for controlling plant pathogens consisting essentially of a *Trichoderma viride* filtrate derived from the fermentation of an endophytic *Trichoderma viride* isolate, wherein the filtrate consists essentially of *Trichoderma viride* conidia and growth regulators secreted by the *Trichoderma viride* during fermentation; and an inert substance selected from the group consisting of flour, kaolin, semolina durum, clay and combinations thereof; wherein the biocontrol formulation is formulated as a dried, shelf-stable granule.

* * * * *